US009367857B2

(12) United States Patent
Linden et al.

(10) Patent No.: US 9,367,857 B2
(45) Date of Patent: Jun. 14, 2016

(54) METHOD FOR PERFORMING REAL-TIME CLICK FRAUD DETECTION, PREVENTION AND REPORTING FOR ONLINE ADVERTISING

(71) Applicant: VALIDCLICK, INC., Conway, AR (US)

(72) Inventors: John Linden, Sherman Oaks, CA (US); Tobias Teeter, Carl Junction, MO (US)

(73) Assignee: Validclick, Inc., Conway, AR (US)

( * ) Notice: Subject to any disclaimer, the term of this patent is extended or adjusted under 35 U.S.C. 154(b) by 0 days.

(21) Appl. No.: 14/573,843

(22) Filed: Dec. 17, 2014

(65) Prior Publication Data

US 2015/0178771 A1 Jun. 25, 2015

Related U.S. Application Data

(63) Continuation of application No. 13/685,086, filed on Nov. 26, 2012, now abandoned, which is a continuation of application No. 11/258,977, filed on Oct. 26, 2005, now Pat. No. 8,321,269.

(60) Provisional application No. 60/621,937, filed on Oct. 26, 2004.

(51) Int. Cl.
*G06Q 30/00* (2012.01)
*G06Q 30/02* (2012.01)

(52) U.S. Cl.
CPC ............ *G06Q 30/0248* (2013.01); *G06Q 30/02* (2013.01); *G06Q 30/0257* (2013.01)

(58) Field of Classification Search
CPC .................................................. G06Q 30/0248
See application file for complete search history.

(56) References Cited

U.S. PATENT DOCUMENTS

| | | | | |
|---|---|---|---|---|
| 6,516,056 | B1 * | 2/2003 | Justice | G06Q 20/4016 379/114.01 |
| 2002/0116257 | A1 * | 8/2002 | Helbig | 705/14 |
| 2003/0014331 | A1 * | 1/2003 | Simons | G06Q 30/02 705/26.62 |
| 2003/0028529 | A1 * | 2/2003 | Cheung | G06Q 30/02 |
| 2004/0153365 | A1 * | 8/2004 | Schneider | G06Q 30/02 705/14.19 |
| 2004/0167928 | A1 * | 8/2004 | Anderson et al. | 707/104.1 |
| 2004/0199597 | A1 * | 10/2004 | Libbey et al. | 709/207 |

* cited by examiner

*Primary Examiner* — Amanda Abrahamson
*Assistant Examiner* — Scott C Anderson
(74) *Attorney, Agent, or Firm* — Gottlieb, Rackman & Reisman, P.C.

(57) ABSTRACT

The present invention provides a method of detecting fraudulent clicks in an online environment to reduce fraudulent paid clicks for online advertisers. The method includes server side and client side code which combined enables a click verification web site to identify valid and invalid clicks and in real-time prevents advertisers from getting billed for fraudulent activity.

22 Claims, 2 Drawing Sheets

METHOD FOR PERFORMING REAL-TIME CLICK FRAUD DETECTION, PREVENTION AND REPORTING FOR ONLINE ADVERTISING

CROSS-REFERENCE TO RELATED APPLICATION

This application is a continuation of U.S. application Ser. No. 13/685,086 filed on Nov. 26, 2012 and now allowed, and which is a continuation of U.S. application Ser. No. 11/258,977 filed Oct. 26. 2005, now U.S. Pat. No. 8,321,269, which issued on Nov. 27, 2012 and which claims the benefit of U.S. application Ser. No. 60/621,937, filed on Oct. 26, 2004, entitled A SYSTEM THAT PERFORMS REAL-TIME CLICK FRAUD DETECTION AND REPORTING FOR THE PAY-PER-CLICK AND PAY-PER-ACTION ONLINE ADVERTISING MARKETS.

BACKGROUND

Click advertising payment programs ("pay-per-click") have become a popular branch of Internet advertising. In the simplest case, the webmaster of the site running the program, here called the Advertiser site, agrees to pay each Affiliate site for each user who clicks through from the Affiliate Site to the Advertiser Site. That is, if a user views a Web page served from the Affiliate Site, and then clicks on a hypertext link (e.g., banner ad, logo, text) in that page to the Advertiser Site, then the Advertiser Site owes the Affiliate Site some predetermined amount of money. The Advertiser Site runs a click-through payment program in order to motivate Affiliate Sites to prominently display ads for the Advertiser Site on its Web pages. Often, the Advertiser Site does not administer such a program itself but rather employs a third-party ad network to administer the click-through program on its behalf.

Click-through counts are also used by the Internet advertising industry at large to determine the effectiveness of a banner ad (its location, design, etc.). Often the click-through rate (i.e., the percentage of users who clicked on the ad after seeing it) is used as a metric to determine the cost of placing the banner ad on a particular Affiliate Site.

As has been recognized in the click-through payment industry, click-through payment programs are susceptible to hit inflation, where an Affiliate Site artificially inflates the click-through count for which it should be paid. Consequently, most ad networks include clauses in their service agreement that explicitly prohibit hit inflation by the Affiliate Site.

SUMMARY

The present invention relates to the real-time monitoring and detection of click fraud in the online advertising industry using client-side scripting code combined with server-side tracking to verify the existence of a user's presence when a pay-per-action (PPA) or pay-per-click (PPC) advertising URL is clicked. An Advertiser makes HTTP requests to a web server containing client-side code when a user goes to a page on the Advertisers' site that includes a PPA or PPC advertisement ("Advertisement") that the Advertiser wishes to prevent fraudulent activity. The Advertiser can request a single Advertisement to be displayed or multiple Advertisements in a HTTP request. When an Advertiser makes a request to the web server containing client-side code, the web server containing client-side code first generates a verification ID for each Advertisement the Advertiser wants to display and stores the verification ID for the Advertisement request. The Advertisement(s) is sent to the Advertiser from the web server containing client-side code along with the verification IDs (or scripting that will generate the verification IDs). The Advertisement URL goes to the web server containing client-side code, not directly to the Advertiser Site. The Advertiser will then display the Advertisement on the Advertiser Site to the User. The Advertiser Site includes a client-side script provided from the web server containing client-side code on its web pages that executes when a User receives the Advertisement. The client-side script can be written in any client-side scripting language that is supported by a web browser.

BRIEF DESCRIPTION OF THE DRAWINGS

FIG. 1 is an illustration of a click-through.
FIG. 2 is an illustration of a simulated click-through.

DETAILED DESCRIPTION

A revenue sharing program between an affiliate and a merchant company that sells a product or service is referred to as an affiliate program. Companies reward affiliates with referral payments for sending customers to the company's website. Typically, an affiliate joins the merchant's program and places links to the merchant's website on the affiliate website or within an html-based email message. When a visitor clicks on the link and makes a purchase, the affiliate earns a referral fee that is usually a pay-per-click fee or pay-per-action based on percentage of the total sale.

For a pay-per-click (PPC) referral fee, the advertiser pays for qualifying clicks to the destination site based on a predetermined per-click rate. Popular PPC advertising options include per-click advertising networks, search engines, and affiliate programs.

For a pay-per-action (PPA) referral fee, the advertiser pays based on qualifying actions such as sales or registrations. The actions defined in a cost-per-action agreement relate directly to some type of conversion, with sales and registrations among the most common. This typically does not include deals based solely on click-throughs.

Figure 1:
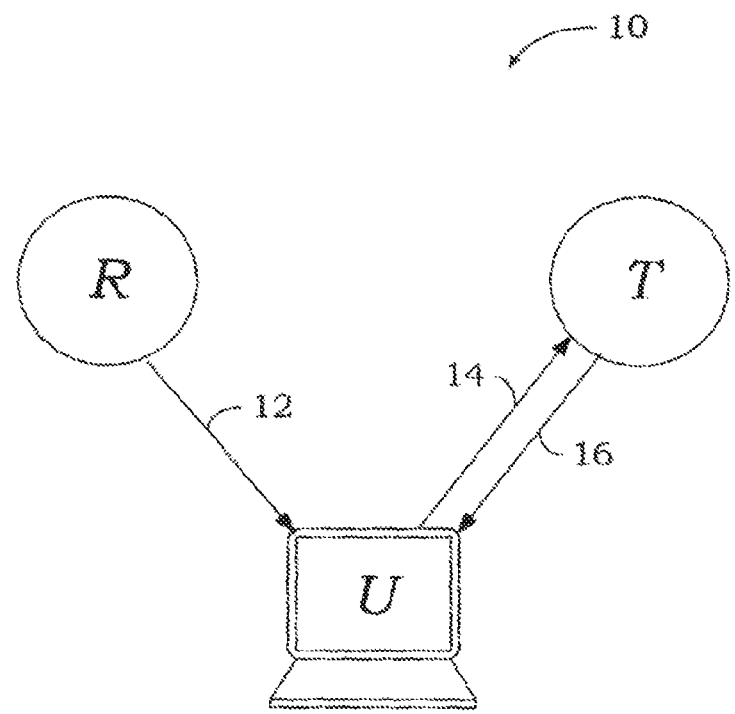

Referring initially to FIG. 1, a click-through program run directly by an Advertiser Site is generally indicated by reference numeral 10. R denotes an Affiliate Site, T denotes the Advertiser Site, and U denotes a user's Web browser. A click-through begins when U retrieves a Web page pageR.html on link 12 from R that contains a hypertext link to a page pageT.html on site T. When the user clicks on the hypertext link, the user's browser issues a request 14 to site T for pageT.html. The Referrer header of the HTTP request for pageT.html is set by the user's browser and names the Web page that "referred" the user to pageT.html, in this case pageR.html, and is included in request 14. T uses this Referrer header to record the URL of the page that referred the user to pageT.html, along with the IP address and other HTTP header information of U. T then returns pageT.html 16 to U for display in the browser.

In a click-through payment program, T will periodically pay R some previously agreed-upon amount for each click-through from R to T. The fact that T pays for click-throughs to R provides R an incentive to mount hit inflation attacks on T, in which R causes T's record of click-throughs from R to be artificially increased. A hit inflation attack is one in which T receives a request for pageT.html with a Referrer header naming pageR.html when no corresponding Web user actually clicked to pageT.html after viewing pageR.html. For example, a straightforward attempt to inflate R's click-through count is for the webmaster of R to run a program that repeatedly sends requests of the appropriate form to T.

Because most click-through programs pay only for "unique" referrals, i.e., click-throughs from users with different IP addresses, multiple click-throughs where the user is at the same site are counted as only one click-through for payment purposes. However, counting unique IP addresses is becoming increasingly ineffective, as more user requests are directed through proxy servers either due to the default configuration of the user's ISP (e.g., 99% of AOL subscribers) or to enhance user privacy.

A sophisticated attacker could issue multiple requests to T with forged IP addresses, thereby circumventing the unique referrals rule. This strategy requires a further degree of technical sophistication and effort on the attacker's part. Moreover, these attacks can be detected by T, due to the fact that in all likelihood, no browser will receive the response from T. So, for example, if pageT.html is constructed with links to images or other HTML elements that a browser would immediately retrieve upon interpreting pageT.html, then a request for pageT.html with a forged IP address will not be followed by requests for the HTML elements contained in pageT.html. If it is feared that the attacker will go one step further and even issue these follow-up requests in a predictive fashion to avoid detection, then T can dynamically generate pageT.html each time with links to different URLs (in the limit, containing a nonce in the URL), thereby foiling any such attempt by the attacker to predict which URLs to request. The end result is that requests with forged IP addresses will stand out to T as those for which correct follow-up requests were not received. Moreover, the perpetrator of this attack will be revealed by the Referrer field of these requests, as this Referrer field must indicate the referrer that is trying to inflate its hits.

Because of the difficulty and detectability of IP address forgery attacks, a common form of hit inflation is one in which the referrer R forces the user to visit the target T by constructing pageR.html so as to automatically "click" the user to pageT.html. This simulated click can be visible to the user, in which case the user will see, e.g., a new window popped up on his screen unsolicited and containing pageT.html. Alternatively, the window can be hidden from the user (e.g., behind the window containing pageR.html or in a frame so small the user cannot see it), so that the user is unaware that she is being "used" by R to gain payment from T. Regardless of whether this hit inflation is visible to the user, these attacks may be detected by T if the webmaster of T periodically visits the Web pages of the referrers. By inspecting the constructions in those Web pages, and observing the behavior of these pages when interpreted by the webmaster's browser, the webmaster of T can detect that hit inflation is occurring. Indeed, this examination could be automated, as it suffices to detect if the referrer's page, when interpreted, causes a request to T's site automatically.

There are numerous variations on click-through programs as described above. In particular, in a program run by a third-party provider, the interaction differs from the above description in that the third party takes the place of T. The third party records the click-through and then redirects the request to the actual Advertiser Site. Another variation is that some click-through programs do not make use of the HTTP Referrer header, but rather simply have each referrer refer to a different URL on the target site. This approach has the advantage of not relying on the Referrer field to be set correctly and thus functioning in conjunction with privacy-enhancing tools that eliminate the Referrer field in the HTTP header. However, this approach exposes the click-through program to additional risks. In particular, the Affiliate Site can broadcast-email ("spam") its own banner ad to increase its click-through count. Thus, most click-through programs of this form explicitly prohibit spamming to increase click-throughs, and will cancel the relationship with the Affiliate Site if the Affiliate Site is detected doing so.

Figure 2:
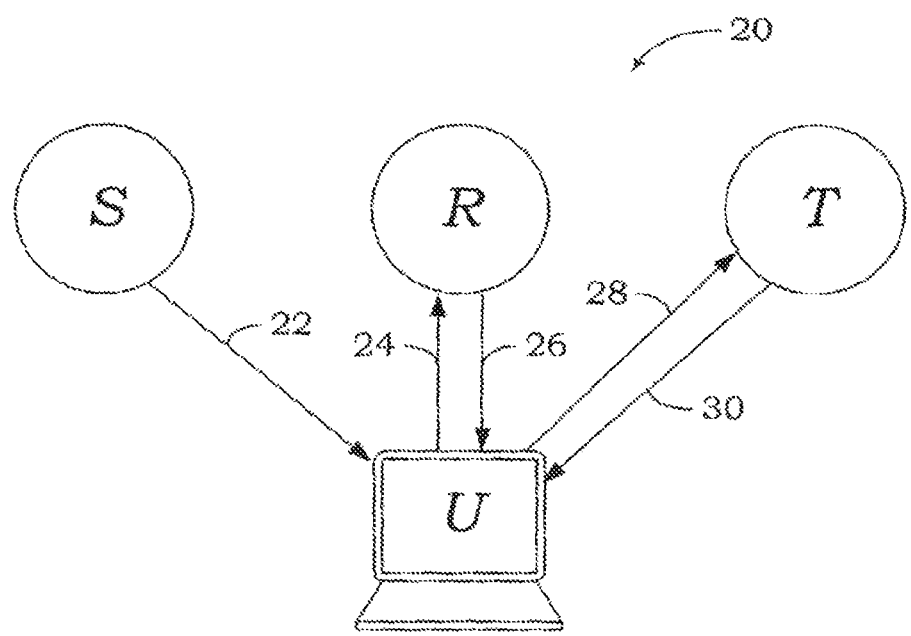

Referring to FIG. 2, an Affiliate Site R may inflate its click-through count by translating hits on another site S that it controls into referrals from site R to the Advertiser Site T using a process generally indicated by reference numeral 20. When a User visits a certain pageS.html on site S, which may have no apparent relationship with site R, it has the side effect of causing a click-through to be credited to pageR.html at site T. T can detect this only if they happen to stumble upon pageS.html and examine it carefully. However, if they have no reason to suspect a relationship between R and S, then confirming this attack is effectively as difficult as exhaustively searching all pages on all Web sites to find pageS.html, i.e., the page that is originating the hit inflation attack. In particular, retrieving pageR.html for examination is of no assistance to T in detecting this attack.

The page pageS.html causes a "simulated click" to pageR.html on site R. A User visits pageS.html and clicks on a link 22 or a simulated click can be done in a way that is invisible to the user. This simulated click causes the user's browser to send a request 24 to site R with a Referrer field naming pageS.html on site S. In response to this request referred by site S, site R returns a modified version of pageR.html 26 to the browser that in turn causes a simulated click to pageT.html 28, the target page. This causes the browser to request pageT.html from T 30 with a Referrer field naming pageR.html, thereby causing T to credit site R with the referral. However, in response to any request for pageR.html that does not contain a Referrer field naming pageS.html, site R returns the normal and innocuous pageR.html that, in particular, does not simulate a click to pageT.html. So, if the webmaster of site T retrieves pageR.html, the page that is retrieved yields no evidence of hit inflation.

A component of this attack is the "simulated click" in which one Web page (the Affiliate Site) causes the user's browser to request another Web page (the Advertiser Site) on another Web site, with a Referrer field naming the referrer. The attack illustrated in FIG. 2 may include two simulated clicks, one from S to R and one from R to T. The preservation of the Referrer field is critical for a simulated click in order for the Referrer to get credit, and this requirement rules out some of the most straightforward possible implementations: e.g., if the referrer serves a page that "refreshes" the browser to the target page using HTML's <meta> tag, then this retrieves the target page but does not preserve the Referrer field. Simulated clicks are already practiced in hit inflation attacks on the Web today.

One feature that makes simulated clicks possible is that modern browsers transmit Referrer information not only for pages requested by explicit user clicks, but also for components embedded in pages like images, and especially sub-documents like frames and layers. For example, the Web page containing a layer is named in the Referrer header of the request for the document contained in the layer, even though no user clicks are involved when the layer contents are retrieved. Therefore, a simple and effective simulated click can be achieved for Netscape Navigator 4.x (NN4) and Microsoft Internet Explorer 4.x (IE4) if the referring site serves a page with a layer that contains the target page (NN3 and IE3 do not support layers). To hide this simulated click from the user, the layer containing the target page may be zero size, or stacked below the containing document so that it is imperceptible to the user. Another form of simulated click can be achieved using frames with IE3 and IE4, since these browsers report the document containing a frameset as the Referrer for the documents in each of the frames. Thus, a referrer can create an invisible, simulated click to a target by serving a page that contains a frameset with a zero-size frame that loads the target page. NN3 and NN4 report the Referrer of the page containing the frameset as the Referrer for each of the documents in the frames. Thus, layers may be used to conduct a subdocument-based simulated click in NN4. It is somewhat more awkward to perform a subdocument-based simulated click in NN3. In order to use the appropriate form of simulated click, the server may determine the user's browser and version from the User-Agent header in the browser's request.

These subdocument-based forms of a simulated click may not be effective because they are still detectable. To avoid detection, a JavaScript for explicitly simulating a click on a link may be used. When a JavaScript script in a Web page causes this simulated click on one of its own links, the browser behaves as if the user clicked on the link, and thus requests the URL of the link and loads it into the browser. In order to hide this simulated click from the user, the referring page can cause the contents of the "clicked" URL to be loaded into a separate window that lies beneath the user's browser window. Then the referring page can quickly close this window once the referred-to page has started loading, or after a brief duration in which the page should have started loading. The attentive user might notice an additional window indicated on her desktop toolbar for a brief moment, but otherwise this additional window will almost certainly go unnoticed by the random user for the brief period of time in which it is present. Even if the user does notice the additional window, the JavaScript script can still prevent the user from exposing it before it is closed by repeatedly raising the main browser window above it.

The JavaScript mechanism to simulate a click on a link differs slightly from browser to browser, and care must be taken to ensure that this simulated click preserves the Referrer field received by the target. In IE4, link objects support the click( ) method that, when invoked, causes the browser to behave as if a user clicked on the link. Referrer information is preserved, i.e., the document containing the link is reported to the target Web site as the Referrer. In NN3 and NN4, as well as in IE3, link objects do not have the convenient click( ) method. However, using a script to send the browser window to the URL corresponding to the link causes the script's page to be reported as the referrer to the target Web site.

Another attack uses two different forms of simulated clicking. The first employs a subdocument (i.e., layer or frame) form of simulated click in the referring page and is referred to as a subdocument-based simulated click. The second employs JavaScript and is referred to as a JavaScript simulated click.

The first simulated click from S is recognized by R. R then serves the "attack" version of pageR.html that causes the simulated click to T. In order to make this attack undetectable to T, T must be unable to detect that the referral from R is by a simulated click. Because of these conflicting requirements, the two simulated clicks in this attack are conducted via different mechanisms.

The simulated click from S to R, so that R recognizes the simulated click from S, is the easiest to achieve. Since S and R are in collaboration, their webmasters can set up the Web sites so that any request that R receives for pageR.html with a Referrer field of pageS.html is by a simulated click from S. This can be ensured if pageS.html has no link to pageR.html that can be clicked by the user. Thus, the subdocument-based approach is ideally suited for this simulated click.

The simulated click from R to T is more sensitive, as T must be unable to detect that the click is simulated. In particular, if JavaScript is enabled in the browser, then a script in pageT.html could detect the subdocument-based simulated click. Specifically, in current browsers pageT.html can use JavaScript to detect whether it is displayed in a frame. Moreover, in version 4 browsers, pageT.html can use JavaScript to detect the size of its window, layer, or frame, and thus pageT.html can be designed to detect the case when it is displayed in a zero-size frame or layer. For these reasons, pageR.html must test for various conditions when conducting its simulated click and tailor its method of attack to them. Specifically, the simulated click from R to T should occur as follows:

1. pageR.html first tests if JavaScript is enabled in the browser. If not (i.e., JavaScript is disabled), then it simulates a click to pageT.html using the subdocument-based simulated click.

2. If JavaScript is enabled in the browser (and thus pageT.html has greater detection capabilities at its disposal), then pageR.html performs the simulated click using the JavaScript method that directs pageT.html to a new window, hidden from the user.

The attack detailed in this section is effective even if a third-party click-through program provider is used. In this case, T is the third-party provider and not the actual target site, but this distinction has no bearing on the mechanism behind the attack. Another difference is that third-party programs often do not make use of the Referrer header for identifying the referrer, but rather simply use a different URL per referrer. In this case, however, the attack just becomes easier since there may be less of a need to retain the correct Referrer header when performing simulated clicks.

This attack has other implications. Most click-through programs are not agreeable to the use of spamming by a referrer to increase click-through counts, and in fact, many click-through programs explicitly prohibit the use of spamming in their contracts with referrers. This attack, however, makes target sites susceptible to "indirect" spamming that is hard to detect: A spammer (an agent of S) can drive a large number of users to S, triggering the inflation attack. The lack of an obvious relationship between R and the spammer or S makes it difficult for the webmaster of T to detect this practice.

Many click-through programs desire "high quality" referrals, i.e., referrer sites with a targeted audience (e.g., technology oriented sites). This attack enables a referrer site R with appropriate content to register in the click-through program, while using a different site S with completely different content to attract the click-throughs. Furthermore, many click-through programs disallow referrers with illicit material, regardless of their popularity. This attack enables referrers R to use such sites to draw users and register click-throughs for R at the target.

To see the potential for profit from this attack, consider that the average click-through rate for banner ads is 1-3%, and that payments for click-throughs are calculated accordingly. This attack can yield an effective rate of almost 100% for users who visit pageS.html and thus (unknowingly) click through pageR.html to pageT.html. If S is used in conjunction with several sites, R1 to R10, for example, that are enrolled in different click-through programs, and an effective click-through rate of 1000% may be attained. This is undetectable as long as the different target sites do not compare the IP addresses from which they receive clicks at the same time.

Thus, this multi-target attack might be impossible with target sites that are on the same third-party click-through program.

An attacker might draw suspicion if the target site T monitors the click through rate (CTR) of its ads. The target can monitor the CTR if R's page is required to load the ads from a site that is controlled by the target. A high click-through rate (say greater than 5%) will likely attract the attention of the target's webmaster, if only to learn the marketing practices of the referrer. The attacker can prevent such inquiries by keeping the CTR low. One way to achieve this is to register site R with, say, 20 different targets. Whenever R receives a request with a Referrer field naming pageS.html, it returns a page containing ads for each of the targets, and performs a simulated click on one of these ads at random. The attacker is paid for 100% of the visits to S, while keeping the CTR below 5% at each target. This method can of course be extended to achieve lower CTR or higher payment rates.

There are essentially two forms of Pay-per-action (PPA) programs: a Pay-per-lead program in which referrers are paid only if the user has performed a significant action at the target site, e.g., if the user registered an account at the target site or performed successive hits at the target site for more than five minutes; and a Pay-per-sale program in which referrers are paid some commission for purchases the user makes at the target site. Typically the referrer displays a link for a specific item for sale at the target site, and is paid some percentage for purchases of this item by referred users.

With PPA, the largest click fraud threat is via parasite-ware. Parasite-ware is an application or website that "steals" credit for transactions from other Affiliates Site. With most PPA advertising, cookies are created by the web browser when a click occurs that will save who the Affiliate Site was that referred the user to the Advertiser Site. When a user later makes a transaction on the Advertiser Site, the Advertiser Site will look at the cookie and properly credit the transaction to the Affiliate Site (if there is a cookie). If more than one Affiliate Site referred the user to the Advertiser prior to a transaction occurring, the last Affiliate Site that made the referral will receive credit for the transaction. With Parasite-ware, the Affiliate that owns the Parasite will auto-click a referral link whenever possible to become the new owner of the transaction in the cookie. Later when a user makes a transaction on the Advertiser Site, the Parasite-ware Affiliate will get the credit for the transaction fraudulently instead of the original Affiliate prior to the auto-click which was the rightful owner of the transaction credit. Desktop applications are the main culprit of using this technique (parasite-ware).

Another form of click fraud that Parasite-ware Affiliates use is to auto-click and receive credit for a later transaction by the user on the Advertiser site, when no Affiliate was the owner of the transaction. This doesn't "steal" credit from another Affiliate since no other Affiliate had credit of the transaction prior to the Parasite-ware Affiliate auto-clicking. However, if there was no Affiliate in the cookie prior to the auto-click, the Advertiser Site shouldn't have paid out a transaction fee to any Affiliate Site. Therefore, when the Parasite-ware Affiliate generated the auto-click, it will get credit for the transaction and essentially steal the transaction fee from the Advertiser Site when none should have been paid.

Figure 3:
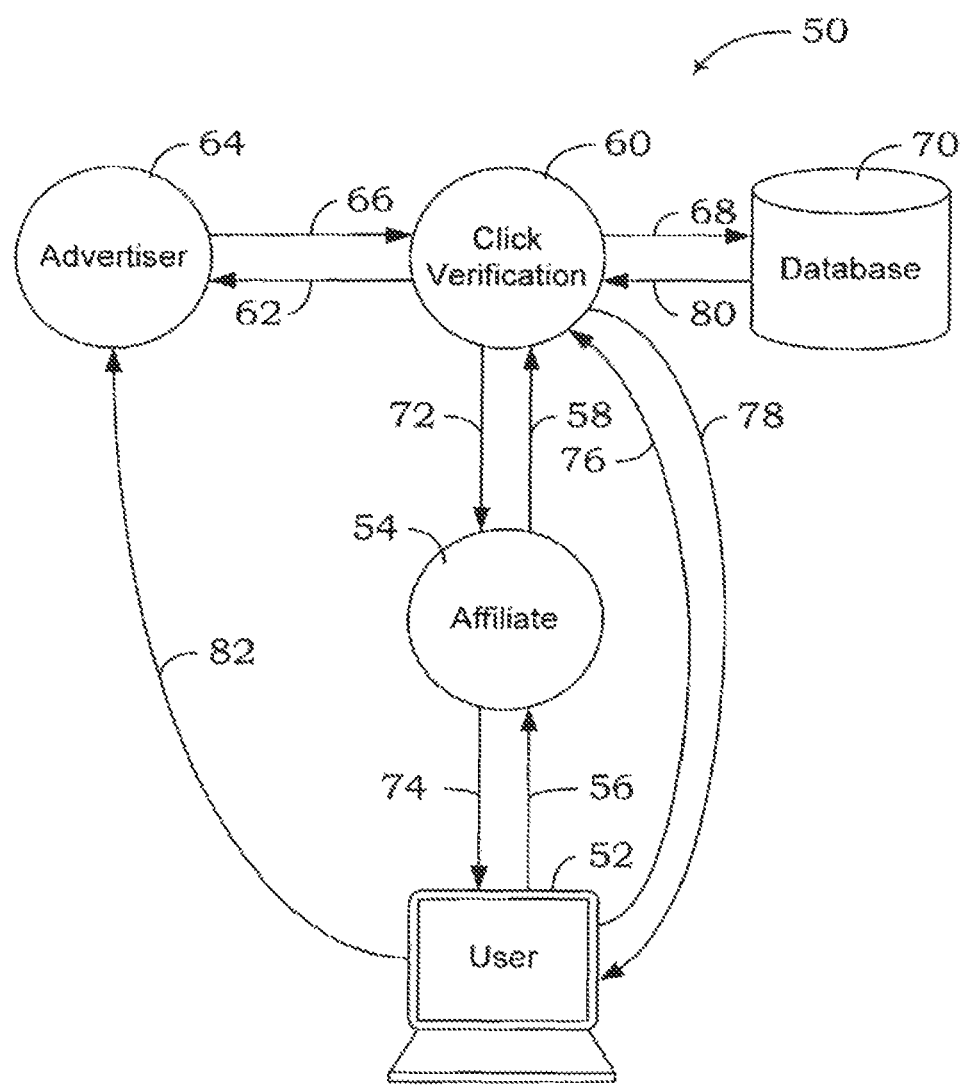
FIG. 3 is a diagrammatic illustration of the method of the present invention.

Referring to FIG. 3, a diagrammatic illustration of a system for real-time monitoring and detection of click fraud in the online advertising industry both PPC and PPA is generally indicated by reference numeral 50. Client-side scripting code combined with server-side tracking is used to verify the existence of a user's presence when a PPA or PPC advertising URL is clicked. The system may be used by either Advertiser Sites or 3rd party advertising networks (Affiliates).

A User 52 goes to an Affiliate web site 54 in search of information on "dogs" for example. The User 52 types "dogs" into a search field displayed on the Affiliate web site 54 and hits the enter button on the User's keyboard. A request 56 is sent to the Affiliate 54, which in turn makes an HTTP request 58 to a Click Verification web server 60, which contains client-side code. The HTTP request includes the keyword "dogs," the IP address of the User 52, and the User agent browser information, for example. The Click Verification web server 60 makes a request 62 for "dogs" to the Advertiser 64. The Advertiser 64 returns the Advertisements 66, which the Advertiser wants to display, to the Click Verification web server 60. The Click Verification Site 60 first generates a verification ID for each Advertisement the Advertiser 64 wants to display and stores the verification ID 68 for each Advertisement request in a database 70 along with the URL of the Advertisement, the User IP address, and the User agent browser information, for example. The Advertisements are then sent 72 to the Affiliate 54 from the Click Verification Site 60 along with the Advertisement URL with the verification IDs embedded in the URL.

The Advertisement URL for each advertisement link sent to the Affiliate 54 points to the Click Verification Site 60, not directly to the Advertiser Site 64. The Affiliate 54 returns the list of Advertisements 74 to the User 52 for display. The Affiliate 54 includes a client-side script provided from the Click Verification Site 60 on the web page which is sent to the User 52 that executes when the User 52 receives the Advertisement. The client-side script may be written in any client-side scripting language that is supported by a web browser such as JavaScript, for example.

The client-side script implemented by the Affiliate 54 is dependent on the way that the Advertisements are shown on the web page. In a pure JavaScript implementation, the client-side script can be built into the JavaScript to display the Advertisements so the Affiliate 54 doesn't need to add anything else to the web page showing the Advertisement. In a XML implementation, the Affiliate 54 will need to add a one line script tag that may be pasted between the <BODY> tag and the </BODY> tag of the web page showing the Advertisement (e.g., <script src="http://www.clickverificationsite.com/verification.js">).

The client-side script begins operating as soon as the web page is loaded and will continue watching for click fraud until the user clicks on an Advertisement. The client-side script will dynamically set up code to execute when certain events occur by the user. The main event that the script will set up is the onmouseover event though it can also be used on many other events in the web browser. In a strict implementation where the Advertisement URL go to straight to the Click Verification Site 60, the client-side script will dynamically assign a onmouseover event handler for each Advertisement URL.

The onmouseover event handler added to each Advertisement URL detects user actions such as the User's mouse or input device moving over the Advertisement. When the action occurs, the event handler calls the script associated with the event handler to send the verification ID along with the User IP address, the User agent browser information, the size of the web browser window, and name of the web page that the user is currently viewing. The event handler may also call the script to store a cookie related to the Advertisement on the User's computer. The Click Verification Site 60 will store the data sent by the event handler script in the Database 70.

There are some implementations of the technology where the Advertisement URL does not go directly to the Click Verification Site 60 but instead goes to a different URL (e.g., an Affiliate 54 tracking URL) and then redirected to the Click Verification Site 60. In this case, the client-side script will implement an onmousemovement event handler for the page instead of a onmouseover event for each Advertisement URL. When the User's mouse has moved more than a specific pixel count, the onmousemovement event handler will create a cookie with a short expiration (for example, expires 5 minutes after it was created). The cookie stores the verification ID, User IP address, and the height and width of the web browser.

When a User clicks on an Advertisement, a HTTP request 76 is made to the Click Verification Site 60 to send the User 52 to the Advertiser Site 64. Alternatively, when a user clicks on an Advertisement, a HTTP request can first go to the Affiliate Site 54 and then immediately redirected to the Click Verification Site 60. Either method requires that the HTTP request end up at the Click Verification Site 60.

Once the Click Verification Site 60 receives the request 76 from the User 52, the Click Verification Site 60 uses the information in the Advertisement URL to retrieve the information 80 from the database 70 that was sent by the client-side script and the information 80 that was generated when the Affiliate Site first requested the Advertisement.

The Click Verification Site 60 will perform a series of analytics to determine if the click on the Advertisement was legitimate. These tests include many tests to compare values of the data collected against rules set up for a particular Affiliate 54. These rules can include but not limited to checking to see if the User is from a valid country, the window size of the browser is greater than a particular width and height, a cookie was able to be set by the User, the User supports JavaScript in their web browser, and if the User IP address has been previously flagged as invalid.

Assuming these tests all pass, the Click Verification Site 60 will look to make sure the correct information and verification ID for this click was valid when the Advertisement was first generated, when the User generated a onmouseover event, and when the Advertisement was clicked, for example. Other events may also be used such as onmousemovement, onmousedown, onclick, onmouseout, onmouseup, onmouse, onmove, onresize, onselect, and onblur, to name a few. If the information stored in the database 70 is complete and correct, the User is verified as legitimate and redirected to the Advertiser Site 64. If any of the tests fail or information does not match or is non-existent, the user is verified as fraudulent and is sent to a safe URL as defined by the Advertiser Site, or is otherwise handled by Advertiser (they can pass the fraudulent click through as a non-paying click, for example). This safe URL ensures that the Advertiser is not charged for the click-through transaction for a PPC advertisement and ensures that a cookie is not created for a PPA advertisement. Preventing the cookie from being created on a PPA advertisement prevents the fraudulent click from getting credit for a transaction later if a transaction occurs.

Types of click fraud detected by this method include: webpage framing ("invisible clicks"); robot/automated clicks (BOT); user simulated clicks; PPA transaction stealing by affiliates; and fraudulent creation of transaction credit by affiliates, for example.

This system may be implemented by Affiliates, PPC Advertising Networks, PPA Advertising Networks, or PPA Advertisers. There are generally two ways to implement PPC and PPC advertising, XML Fraud Protection Implementation and HTML-based Fraud Protection Implementation.

XML Fraud Protection Implementation is the first common method of implementing PPC and PPA advertising by providing Affiliates with an XML feed. The XML feed is generated by the Advertiser or Advertising Network and includes one or more Advertisements in the XML. The XML feed usually contains information about the Advertisement such as the Description, the Title, the URL to show an image for the Advertisement, and a click-through URL to send the User to when the Advertisement is selected. Each XML feed may differ in what is provided from the Advertiser.

For example, an Advertiser XML feed may be as follows:

```
<XML STRUCTURE>
    <LISTING>
        <ID>1</ID>
        <TITLE>Listing 1 Title</TITLE>
        <DESCRIPTION>This is the description of Listing
1 </DESCRIPTION>
        <URL>http://www.samplesite.com/MyListing 1 </URL>
    </LISTING>
    <LISTING>
        <ID>2</ID>
        <TITLE>Listing 2 Title</TITLE>
        <DESCRIPTION>This is the description of Listing
2</DESCRIPTION>
        <URL>http://www.samplesite.com/MyListing2</URL>
    </LISTING>
</XML STRUCTURE>
```

To implement the present system with an XML feed, the click-through URL is pointed to the Click Verification Site which then redirects the User to the Advertiser's Site or a Safe URL.

For example, <a href="http://www.clickverificationsite.com/advertisement URL">.

The Affiliate also includes a one-line script tag on any web page on the

Affiliate Site that would display the Advertisement.

For example, <script src="http://www.clickverification-site.com/verification.js">.

Below is an example of what the XML feed enabled with the present method might look like:

```
<XML STRUCTURE>
    <LISTING>
        <ID>1</ID>
        <TITLE>Listing 1 Title</TITLE>
        <DESCRIPTION> This is the description of Listing 1
</DESCRIPTION>
        <URL>http://www.clickverificationssite.com/advertisementURL</URL>
    </LISTING>
    <LISTING>
        <ID>2</ID>
        <TITLE>Listing 2 Title</TITLE>
        <DESCRIPTION>This is the description of Listing 2
</DESCRIPTION>
        <URL>
http://www.clickverificationsite.com/advertisementURL2</URL>
    </LISTING>
</XML STRUCTURE>
```

The other way Advertisers and Advertising networks may implement PPC and PPA advertising is through single Advertisement HTML code snippets. The HTML includes an <img> tag which shows the Advertisement and an <a> tag which is the click-through URL to the Advertisement. These snippets are placed on an Affiliate Site to display the Advertisement.

For example, a HTML code snippet is as follows:

```
<a href="http://www.advertiserssite.com/click-1437556-3998614"
target="_top" >
<img src="http://www.advertiserssite.com/image-1437556-3998614"
width="120" height="90" alt="Advertiser's Description" border="0"></a>
```

The click-through URL is pointed to the Click Verification Site instead of directly to the Advertiser's Site:

```
<a href="http://www.clickverificationsite.com/ advertisementURL"
target="_top" >
<img src="http://www.advertiserssite.com/image-1437556-3998614"
width="120" height="90" alt="Advertiser's Description" border="0"></a>
```

Like the XML implementation, the Affiliate places a one line <script> tag on each web page that displays the Advertisement:
  <script src="http://www.clickverificationsite.com/verification.js">

The client-side scripting code allows for the system to utilize JavaScript or another client-side programming language such as Macromedia® Flash, Java, ActiveX or VBScript, for example, on the Affiliate Site to check user actions (such as a mouse movement or other action) and then sends information back to the Click Verification Site when an event occurs. Thus, when an Advertiser URL is clicked the Click Verification Site is able to check that the variable matches the verification ID from the user action and the verification ID that was issued and stored when the XML was created. This detection also detects an invalid framed click as there is no window status available in the framed click. However, other checks like framed clicks may be added to increase the complexity of this method thereby making it much more difficult for an attacker to understand and/or detect what they are trying to beat.

It is to be understood that while certain forms of this invention have been illustrated and described, it is not limited thereto except insofar as such limitations are included in the following claims and allowable equivalents thereof.

Having thus described the invention, what is claimed as new and desired to be secured by Letters Patent is:

1. A method for a processor based server programmed to detect click fraud, to determine disposition of a payment for a clicked advertisement, and to direct a response to said click, comprising the steps of:
  in response to a request originating from a network-connected user device for delivery of content, delivering to the requesting device client-side scripting code for tracking user actions, a tracking ID, and delivery instruction for displaying at least one clickable advertisement, said tracking ID associated with said advertisement;
  upon a user action relative to said advertisement, said server receiving from said device data prepared by said scripting code indicating said action and said tracking ID;
  said processor analyzing said action and said tracking ID against a set of rules relative to click fraud detection; and
  based on said analysis, said processor identifying a recommended response to said action, to direct an internet-connected element to deliver said response and to determine disposition of a payment for said click;
  wherein click fraud is directed to fraudulent use based on intent to increase a click count without interest in a target advertisement associated with said clickable advertisement.

2. The method of claim 1, wherein upon a click on said advertisement, said server receives data from said device comprising at least one of a user IP address, user agent browser information, and a name of a current web page being viewed; and said analysis for determining disposition of payment further comprises analysis of at least one of a user IP address, user agent browser information, and a name of a current web page being viewed.

3. The method of claim 1, wherein said action comprises at least one of an onmousemovement event, an onmouseover event, an onmousedown event, an onmouseout event, an onclick event, an onmouseup event, an onmouse event, an onmove event, an onresize event, an onselect event, a change in mouse coordinates, a size of a web browser, and an on blur event.

4. The method of claim 1, wherein said analysis for determining disposition of a payment further includes determining if an increase greater than a predetermined level in overall click rate associated with said advertisement has occurred to determine if said click on said advertisement is fraudulent.

5. The method of claim 1, wherein said client-side scripting code is written in an interpreted scripting language.

6. The method of claim 1, wherein said request from a network-connected user device for delivery of content comprises a request for an affiliate web page, said affiliate web page comprising a script-tag associated with said client-side scripting code.

7. The method of claim 1, wherein said received device data include the user device IP address determined using said client-side code.

8. The method of claim 1, wherein said rules are selected from the group consisting of country validity, browser window size, a user settable cookie, whether the web browser supports JavaScript, and a flagged invalid IP address.

9. The method of claim 1, wherein said rules are selected from the group consisting of webpage framing; invisible clicks; robot/automated clicks; user simulated clicks; PPA transaction stealing; and fraudulent creation of transaction credit.

10. The method of claim 1, wherein said received device data include data relative to a stored cookie created by said client side code.

11. The method of claim 1, wherein an action includes one or more of tap, taphold, swipe, swipeleft, swiperight, scrollstart, scrollstop, orientationchange, pinch, zoom, touchstart, touchend, touchmove, and touchcancel.

12. A method for a processor based server programmed to detect click fraud and to filter responses to advertisement clicks based on said detection of click fraud, comprising the steps of:
  delivering client-side scripting code to a user device for tracking user actions, a tracking ID, and delivering instruction for displaying at least one clickable advertisement, said tracking ID associated with said advertisement;
  upon a user action relative to said advertisement, said server receiving indication of said user action and said tracking ID from said device, said indication being prepared by said scripting code; and
  analyzing said received indication and said received tracking ID against a set of rules regarding click fraud so as to determine any fraudulent use; and
  based on said analysis, said processor identifying a recommended response to said action and to direct an internet-connected element to deliver said response;
  wherein click fraud is fraudulent use based on intent to increase a click count without interest in a target advertisement associated with said clickable advertisement.

13. The method of claim 12, wherein an action includes one or more of an onmousemovement event, an onmouseover event, an onmousedown event, an onmouseout event, an onclick event, an onmouseup event, an onmouse event, an onmove event, an onresize event, an onselect event, a change in mouse coordinates, a size of a web browser, and an on blur event.

14. The method of claim 12, wherein at least one said rule includes determining if an increase greater than a predetermined level in overall click rate associated with said advertisement has occurred.

15. The method of claim 12, wherein said client-side scripting code is written in an interpreted scripting language.

16. The method of claim 12, wherein said analysis further comprises analysis of at least one of a user IP address, user agent browser information, and a name of a current web page being viewed.

17. The method of claim 12, wherein at least one said rule includes determining if a user is from a valid country, if a cookie was generated, if a user IP address is valid, and if a current web page being viewed is valid.

18. The method of claim 12 further comprising the step of before delivering client-side scripting code, receiving a request from said device for said client-side scripting code in response to the rendering of an affiliate web page by a browser on said user device, said web page comprising a script-tag associated with said client-side scripting code.

19. The method of claim 12, wherein data received from said device include the user device IP address.

20. The method of claim 12, wherein said rules are selected from the group consisting of browser window size, a user settable cookie, whether the web browser supported JavaScript, and previously flagged invalid IP address.

21. The method of claim 12, wherein said received device data include data relative to a stored cookie created by said client side code.

22. The method of claim 12 wherein an action includes one or more of tap, taphold, swipe, swipeleft, swiperight, scrollstart, scrollstop, orientationchange, pinch, zoom, touchstart, touchend, touchmove, and touchcancel.

* * * * *